United States Patent
Sekine et al.

(10) Patent No.: US 12,330,381 B2
(45) Date of Patent: Jun. 17, 2025

(54) PREFORM SHAPING APPARATUS, PREFORM SHAPING METHOD AND COMPOSITE MATERIAL MOLDING METHOD

(71) Applicant: TSUDAKOMA KOGYO KABUSHIKI KAISHA, Ishikawa-ken (JP)

(72) Inventors: Naoyuki Sekine, Tokyo (JP); Yuta Inoue, Tokyo (JP); Isao Nishmura, Kanazawa (JP)

(73) Assignee: TSUDAKOMA KOGYO KABUSHIKI KAISHA, Ishikawa-ken (JP)

( * ) Notice: Subject to any disclaimer, the term of this patent is extended or adjusted under 35 U.S.C. 154(b) by 0 days.

(21) Appl. No.: 18/228,089

(22) Filed: Jul. 31, 2023

(65) Prior Publication Data
US 2023/0373170 A1 Nov. 23, 2023

Related U.S. Application Data

(62) Division of application No. 16/880,605, filed on May 21, 2020, now abandoned.

(30) Foreign Application Priority Data

Aug. 30, 2019 (JP) .................................. 2019-159135

(51) Int. Cl.
*B29C 70/46* (2006.01)
*B29B 11/16* (2006.01)
(Continued)

(52) U.S. Cl.
CPC .............. *B29C 70/46* (2013.01); *B29B 11/16* (2013.01); *B29C 70/18* (2013.01); *B29C 70/528* (2013.01);
(Continued)

(58) Field of Classification Search
CPC ....... B29C 70/461; B29C 70/46; B29C 51/20; B29C 51/02; B29C 70/541
See application file for complete search history.

(56) References Cited

U.S. PATENT DOCUMENTS 5,817,265 A   10/1998  Gendreau
5,882,462 A    3/1999  Donecker et al.
(Continued)

FOREIGN PATENT DOCUMENTS

DE   10 2012 104 044 A1   11/2013
EP         1 731 282 A1   12/2006
(Continued)

OTHER PUBLICATIONS

JP2007001298 machine translation (Year: 2007).*
(Continued)

*Primary Examiner* — S. Behrooz Ghorishi
*Assistant Examiner* — Alexander A Wang
(74) *Attorney, Agent, or Firm* — Paratus Law Group, PLLC

(57) ABSTRACT

According to one implementation, a preform shaping method for producing a preform having a web, a flange, and a chamfered portion includes: pressing a first portion of a laminated body of fiber sheets by sandwiching the first portion between a first mold and a second mold; and pressing a second portion of the laminated body of the fiber sheets after pressing the first portion. The first portion corresponds to the web. The second portion corresponds to the flange. The first mold fits a surface in one side of the web, an inner surface of the chamfered portion and a surface in one side of the flange. The second mold fits a surface in the other side of the web. The second portion is pressed by sandwiching the second portion between the first mold and a third mold.

2 Claims, 10 Drawing Sheets

(51) Int. Cl.
  *B29C 70/18*   (2006.01)
  *B29C 70/52*   (2006.01)
  *B29C 70/54*   (2006.01)
  *B29C 71/04*   (2006.01)
  *B29D 99/00*   (2010.01)
  *B29B 11/08*   (2006.01)

(52) U.S. Cl.
  CPC ............ *B29C 70/541* (2013.01); *B29C 71/04* (2013.01); *B29D 99/0003* (2013.01); *B29B 11/08* (2013.01)

(56) References Cited

U.S. PATENT DOCUMENTS

| | | | |
|---|---|---|---|
| 2004/0219251 | A1 | 11/2004 | Eberth et al. |
| 2007/0149080 | A1 | 6/2007 | Asahara et al. |
| 2015/0008619 | A1 | 1/2015 | Maertiens |
| 2015/0048555 | A1 | 2/2015 | Nagasaki et al. |
| 2016/0288380 | A1 | 10/2016 | Marchal et al. |
| 2018/0186101 | A1 | 7/2018 | Ikeda et al. |
| 2020/0198185 | A1* | 6/2020 | Hirabayashi ............ B29C 43/56 |

FOREIGN PATENT DOCUMENTS

| | | | |
|---|---|---|---|
| EP | 2 829 569 | A1 | 1/2015 |
| EP | 3 321 055 | A1 | 5/2018 |
| JP | H07-214708 | A | 8/1994 |
| JP | H11-512670 | A | 11/1999 |
| JP | 2007-001298 | A | 1/2007 |
| JP | 2009-119701 | A | 6/2009 |
| JP | 2009-226654 | A | 10/2009 |
| JP | 2016-010926 | A | 1/2016 |
| JP | 2016-036963 | A | 3/2016 |
| JP | 2017-213819 | A | 12/2017 |

OTHER PUBLICATIONS

Japanese Office Action, dated May 23, 2023, in Japanese Application No. 2019-159153 and English Translation thereof.
Japanese Office Action, dated Jul. 11, 2023, in Japanese Application No. 2019-159135 and English Translation thereof.
United States Notice of Allowance dated Jun. 21, 2023, in co-pending U.S. Appl. No. 16/880,584.
Communication pursuant to Article 94(3) EPC dated Jan. 19, 2023, in European Application No. 20180971.2.
United States Office Action dated Feb. 7, 2023, in co-pending U.S. Appl. No. 16/880,584.
Tsuji, JP2007001298 machine translation (Year: 2007).
Extended European Search Report issued Dec. 7, 2020 for European Patent Application No. 20180972.0-1017.
Extended European Search Report issued Dec. 7, 2020 for European Patent Application No. 22156343.0-1103.
Extended European Search Report issued Dec. 14, 2020 for European Patent Application No. 2018-0971.2-1017.
United States Office Action dated Aug. 3, 2022, in co-pending U.S. Appl. No. 16/880,584.
Communication pursuant to Article 94(3) EPC dated Nov. 7, 2022, in European Application No. EP 20 180 972.0-1103.

* cited by examiner

PREFORM SHAPING APPARATUS, PREFORM SHAPING METHOD AND COMPOSITE MATERIAL MOLDING METHOD

CROSS-REFERENCE TO RELATED APPLICATIONS

The present application is a Divisional Application of U.S. patent application Ser. No. 16/880,605, filed on May 21, 2020, which is based upon and claims the benefit of priority from Japanese Patent Application No. 2019-159135, filed on Aug. 30, 2019, the entire contents of which are incorporated herein by reference.

FIELD

Implementations described herein relate generally to a preform shaping apparatus, a preform shaping method and a composite material molding method.

BACKGROUND

Conventionally, RTM (Resin Transfer Molding) method has been known as a method of molding an FRP (Fiber Reinforced Plastic), such as GFRP (Glass Fiber Reinforced Plastic) or CFRP (Carbon Fiber Reinforced Plastic), called a composite material, consisting of resin reinforced with fibers.

The RTM method is a molding method of a composite material by which fiber sheets are impregnated with thermosetting resin and thermally cured after laminating the fiber sheets. The RTM method by which fibers are impregnated with resin by vacuuming is called VaRTM (Vacuum assisted Resin Transfer Molding) method while the RTM method by which fibers are impregnated with resin using molds is called Matched-die RTM method.

When a composite material is molded by the RTM method, a dry preform is produced in advance of impregnation with resin. A dry preform is produced by shaping a laminated body of fibers sheet according to a shape of a molded composite material. Such a dry preform produced by laminating fiber sheets is often fixed temporarily by interposing thermoplastic binder so that the fibers may not loosen.

A tape-like fiber base material is called a dry tape material. A dry tape material in which thermoplastic non-woven fabric has been laminated, and a dry tape material to which thermoplastic particulates have been attached are commercially available. Accordingly, when dry tape materials including thermoplastic binder are laminated, a dry tape material can be temporarily fixed to an adjacent dry tape material by heat-sealing the binder in spots at a certain interval using a dedicated heater. Thereby, slippage and separation of the laminated dry tape materials can be prevented.

One of known various methods is a method of shaping a dry preform into a shape of a molded composite material by laminating dry tape materials on a flat jig and subsequently pressing the laminated dry tape materials by a mold while heating the laminated dry tape materials. In particular, a method of shaping a preform by pressing fibers with molds while stretching the fibers in order to shape a complicated preform having a boundary part, bent inside so as to be concave, between a flange and a web has been proposed (for example, refer to Japanese Patent Application Publication JP2009-119701 A).

When a dry preform having a complicated shape with a web and a flange is shaped by pressing a laminated body of fiber sheets by a mold or molds, the fibers sometimes wrinkle or rip unfavorably.

Accordingly, an object of the present invention is to prevent fibers from wrinkling and ripping in case of producing a dry preform, having a web and a flange, by pressing a laminated body of fiber sheets by at least one mold.

SUMMARY OF THE INVENTION

In general, according to one implementation, a preform shaping apparatus produces a preform having a web, at least one flange, and a chamfered portion between the web and the at least one flange by pressing a laminated body of fiber sheets with a plurality of molds. The at least one flange is bent in a single side of the web. The chamfered portion is at least one of a round chamfered edge or a flat chamfered edge. The preform shaping apparatus includes a first mold, a second mold, a third mold and a drive mechanism. The first mold has a first surface fitting each of a surface in one side of the web, an inner surface of the chamfered portion and a surface in one side of the at least one flange. The second mold has a second surface fitting a surface in the other side of the web. The third mold has a third surface fitting each of a surface in the other side of the at least one flange and an outer surface of the chamfered portion. The drive mechanism includes a first lifting device configured to move at least one of the first mold and the second mold up and down in a vertical direction between a first retreat position where a first distance between the first mold and the second mold becomes longer than a thickness of the web and a first press position where the first distance becomes the thickness of the web, and a second lifting device configured to move the third mold up and down in a vertical direction between a second retreat position where a second distance between the first mold and the third mold becomes longer than each thickness of the at least one flange and the chamfered portion and a second press position where the second distance becomes each thickness of the flange and the chamfered portion, and a slide device configured to move the third mold horizontally in a horizontal direction between the second retreat position and the second press position. The drive mechanism is configured to change the first distance from a distance, longer than the thickness of the web, to the thickness of the web, and subsequently change the second distance from a distance, longer than each thickness of the at least one flange and the chamfered portion, to the each thickness of the at least one flange and the chamfered portion.

Further, according to one implementation, a preform shaping apparatus includes a first mold, a second mold, a drive mechanism, a heater, and a sheet. The first mold has a first surface fitting a first partial surface of a preform. The second mold has a second surface fitting a second partial surface, other than the first partial surface, of the preform. The drive mechanism relatively positions the first mold and the second mold. The drive mechanism changes a distance between the first mold and the second mold from a distance, longer than a thickness of the preform, to the thickness of the preform. The heater heats at least one of the first surface of the first mold and the second surface of the second mold. The sheet is interposed between a laminated body of fiber sheets and at least one of the first mold and the second mold. The laminated body of the fiber sheets is a material of the preform. The sheet has heat resistance and heat insulating property. The sheet has holes and limits, in the holes, heat conduction from the at least one of the first surface and the second surface heated by the heater to the laminated body of the fiber sheets.

Further, according to one implementation, a preform shaping method for producing a preform having a web, at least one flange, and a chamfered portion between the web and the at least one flange includes: pressing a first portion of a laminated body of fiber sheets by sandwiching the first portion between a first mold and a second mold; and pressing a second portion of the laminated body of the fiber sheets after pressing the first portion. The at least one flange is bent in a single side of the web. The chamfered portion is at least one of a round chamfered edge or a flat chamfered edge. The first portion corresponds to the web. The first mold has a first surface fitting each of a surface in one side of the web, an inner surface of the chamfered portion and a surface in one side of the at least one flange. The second mold has a second surface fitting a surface in the other side of the web. The second portion is pressed by sandwiching the second portion between the first mold and a third mold. The second portion corresponds to the at least one flange. The third mold has a shape fitting each of a surface in the other side of the at least one flange and an outer surface of the chamfered portion.

Further, according to one implementation, a preform shaping method includes: pressing a laminated body of fiber sheets by sandwiching the laminated body of the fiber sheets between a first mold and a second mold; and producing the preform by heating at least one of the first surface and the second surface by a heater and thereby temporarily fixing the laminated body of the fiber sheets by the binder. The first mold has a first surface fitting a partial surface of a preform. The second mold has a second surface fitting another partial surface of the preform. The laminated body of the fiber sheets includes binder. A sheet having heat resistance, heat insulating property and holes is disposed between the laminated body of the fiber sheets and the at least one of the first surface and the second surface heated by the heater, and thereby heat conduction from the at least one of the first surface and the second surface heated by the heater to the laminated body of the fiber sheets is limited in the holes.

Further, according to one implementation, a preform shaping method includes: producing the preform by the above-mentioned preform shaping apparatus.

Further, according to one implementation, a composite material molding method includes: producing a composite material by impregnating the preform with thermosetting resin or thermoplastic resin, and curing the thermosetting resin or the thermoplastic resin. The preform is produced by the above-mentioned preform shaping method.

BRIEF DESCRIPTION OF THE DRAWINGS

In the accompanying drawings.

DETAILED DESCRIPTION

Figure 1:
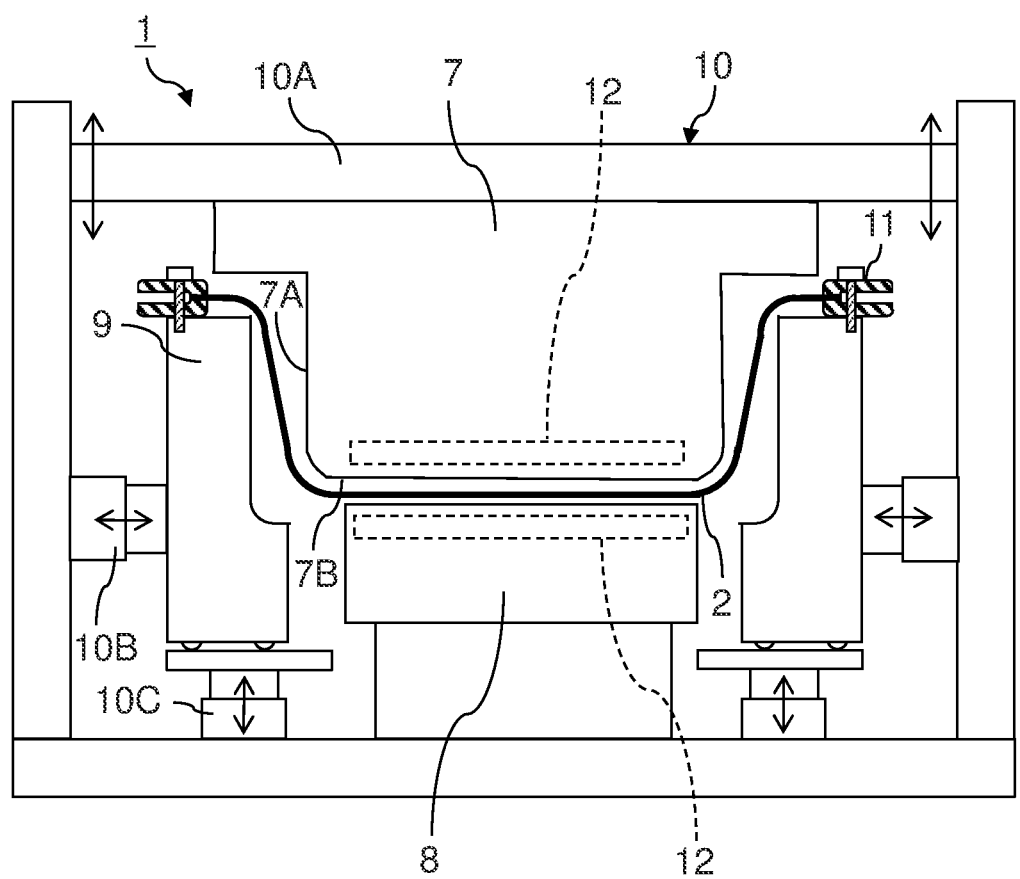
FIG. 1 shows a structure of a preform shaping apparatus according to the first implementation of the present invention.
Figure 2:
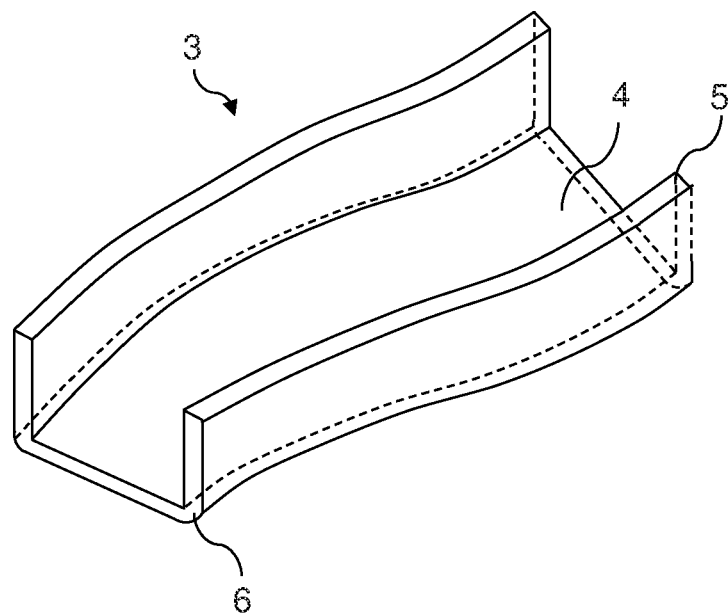
FIG. 2 is a perspective view showing an example of a shape of a dry preform produced by the preform shaping apparatus shown in FIG. 1.

A preform shaping apparatus, a preform shaping method and a composite material molding method according to implementations of the present invention will be described with reference to the accompanying drawings.
(First Implementation)
(Structure and Function of Preform Shaping Apparatus)
FIG. 1 shows a structure of a preform shaping apparatus according to the first implementation of the present invention. FIG. 2 is a perspective view showing an example of a shape of a dry preform produced by the preform shaping apparatus shown in FIG. 1.

A preform shaping apparatus 1 is a pressing machine which shapes a laminated body 2 of fiber sheets as material for producing a dry preform 3 which is a preform of which fibers have not been impregnated with resin.

For example, a dry preform 3 to be produced by the preform shaping apparatus 1 has a web 4 and at least one flange 5 having a shape bent in one side of the web 4 as exemplified by FIG. 2. Although the dry preform 3 having the two flanges 5 in one side of the web 4 has been exemplified by FIG. 2, the dry preform 3 having one flange 5 at the end of one surface of the web 4, or the dry preform 3 having one flange 5, forming a closed surface inside, in one side of the web 4 may be an object to be shaped by the preform shaping apparatus 1.

Each flange 5 has a shape which is not formed in both sides of the web 4, but bent in one side of the web 4. Accordingly, a convex chamfered portion 6 consisting of at least one of a round honed edge (R-chamfered edge) and a typical flat chamfered edge (C-chamfered edge) is formed between the web 4 and each flange 5. Each flange 5 may have not only a flat surface, but also a concave curved surface, a convex curved surface, or both a concave curved surface and a convex curved surface. That is, the flange 5 may be curved.

The preform shaping apparatus 1 can be composed of an upper mold 7, a lower mold 8, flange molds 9, a drive mechanism 10, fixing jigs 11 and heaters 12. Each of the upper mold 7, the lower mold 8 and the flange molds 9 is coupled to the drive mechanism 10.

The upper mold 7 is a rigid mold for pressing the inner surface of the dry preform 3. More specifically, the upper mold 7 is a mold for pressing one surface of the web 4 which becomes the inner surface as a result of bending the flanges 5, the inner surfaces of the chamfered portions 6 and the inner surfaces of the flanges 5. Therefore, the surface of the upper mold 7 has a shape fitting to one surface of the web 4, the inner surface of each chamfered portion 6 and one surface of each flange 5. Note that, the surface of the web 4 may be not only flat but also curved.

The lower mold 8 is a rigid mold for pressing a portion, corresponding to the web 4, between the upper mold 7 and the lower mold 8. More specifically, the lower mold 8 is a mold for pressing the other surface of the web 4 which becomes the outer surface as a result of bending the flanges 5. Therefore, the surface of the lower mold 8 has a shape fitting to the other surface of the web 4.

The flange molds 9 are rigid molds for pressing portions, corresponding to the flanges 5, between the upper mold 7 and the flange molds 9, respectively. More specifically, the flange molds 9 are molds for pressing the other surfaces of the flanges 5, which become the outer surfaces as a result of bending the flanges 5, and the outer surfaces of the chamfered portions 6 respectively. Therefore, the surface of each flange mold 9 has a shape fitting to the other surface of the flange 5 and the outer surface of the chamfered portion 6.

When the flange molds 9 are prepared separately from the lower mold 8, a portion corresponding to the web 4 and portions corresponding to the flanges 5 can be pressed separately at different timing. Accordingly, the portions corresponding to the flanges 5 can be pressed after the portion corresponding to the web 4 has been pressed so that neither wrinkles nor rips may be generated in the laminated body 2 of fiber sheets.

Each flange mold 9 for pressing the portion corresponding to the flange 5 can be dividedly disposed in the length direction of the flange 5, as necessary. In that case, different portions corresponding to the flange 5 can be also pressed separately at different timing in the length direction of the flange 5.

Figure 3:
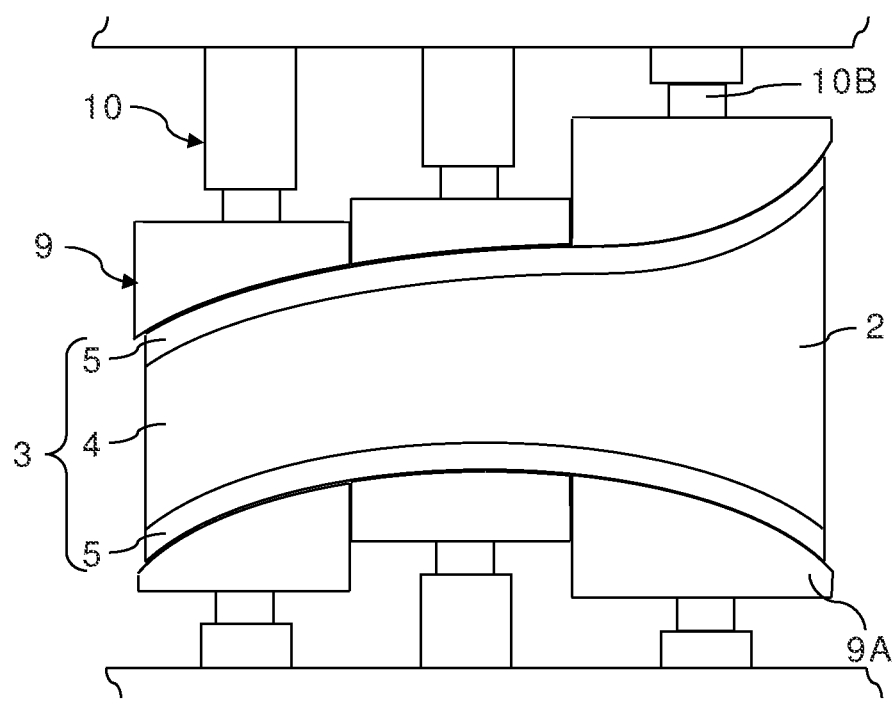
FIG. 3 is a top view of the flange molds of FIG. 1, showing an example of composing each of the flange molds of divided molds.

FIG. 3 is a top view of the flange molds 9 of FIG. 1, showing an example of composing each of the flange molds 9 of divided molds 9A. Note that, the shape of the dry preform 3 exemplified by FIG. 2 differs from that of the dry preform 3 shaped by the flange molds 9 exemplified by FIG. 3.

As exemplified by FIG. 3, each flange mold 9 can be composed of the divided molds 9A disposed at different positions in the length direction of the flange 5. In this case, it becomes possible to press portions of each flange 5 stepwisely at different timing by pressing the divided molds 9A to the laminated body 2 of fiber sheets at the different timing.

It is desirable to dispose the divided molds 9A at such positions that portions corresponding to the flanges 5 can be pressed stepwisely in an order not so as to generate wrinkles and rips in the laminated body 2 of fiber sheets as much as possible. For example, when the curvature of the flange 5 is constant, pressing the flange 5 gradually and stepwisely at different timing from the center of the flange 5 toward both end sides leads to reduction in the risk of generation of wrinkles and rips in the fibers. Therefore, when the curvature of the flange 5 is constant, it is desirable to dispose the divided molds 9A so that the flange 5 can be pressed in steps from the center of the flange 5 toward both end sides.

Meanwhile, when the curvature of the flange 5 is not constant, pressing the flange 5 gradually and stepwisely at different timing from a portion, at which the curvature of the flange 5 is large, toward both end sides or in a single direction leads to reduction in the risk of generation of wrinkles and rips in the fibers. Therefore, when the curvature of the flange 5 is not constant, it is desirable to dispose the divided molds 9A so that the flange 5 can be pressed in steps from a portion, at which the curvature of the flange 5 is large, toward both end sides or in a single direction.

Moreover, when the flange 5 has both a convexly curved portion and a concavely curved portion, pressing the laminated body 2 of fiber sheets into a shape of the flange 5 loosens fibers in the concave surface of the flange 5 and pulls fibers in the convex surface of the flange 5, and thereby tension is generated in the convex surface of the flange 5. Accordingly, pressing the portion, at which the fiber sheets are pulled in order to form the flange 5, and the portion, at which the fiber sheets are loosened in order to form the flange 5, stepwisely at different timing leads to reduction in the risk of generation of wrinkles and rips in the fibers. Therefore, when the flange 5 has both a convexly curved portion, at which the fiber sheets are pulled, and a concavely curved portion, at which the fiber sheets are loosened, it is desirable to dispose the divided molds 9A so that the convexly curved portion and the concavely curved portion can be pressed separately at different timing.

As described above, the inner surfaces of the flanges 5, the web 4 and the chamfered portions 6 are pressed by the single upper mold 7 while the outer surfaces of the flanges 5, the web 4 and the chamfered portions 6 are pressed by the lower mold 8, and the single flange mold 9 or the flange mold 9 composed of the divided molds 9A.

The drive mechanism 10 relatively positions the upper mold 7, the lower mold 8 and the flange molds 9. More specifically, the drive mechanism 10 is a device which moves the upper mold 7, the lower mold 8 and the flange molds 9 between retreat positions for setting the laminated body 2 of fiber sheets and pressing positions for applying pressure on the laminated body 2 of fiber sheets respectively.

The retreat positions of the upper mold 7, the lower mold 8 and the flange molds 9 are determined so that the unshaped laminated body 2 of fiber sheets can be placed in a space formed between the upper mold 7, the lower mold 8 and the flange molds 9. Therefore, the retreat positions of the upper mold 7, the lower mold 8 and the flange molds 9 are determined so that the distance between the upper mold 7 and the lower mold 8 may be longer than the thickness of the web 4, and the distances between the upper mold 7 and the flange molds 9 may be longer than the thicknesses of the flanges 5 and the chamfered portions 6 respectively.

Meanwhile, the pressing positions of the upper mold 7, the lower mold 8 and the flange molds 9 are determined so that a space formed between the upper mold 7, the lower mold 8 and the flange molds 9 may be a shape of the dry preform 3. Therefore, the pressing positions of the upper mold 7, the lower mold 8 and the flange molds 9 are determined so that the distance between the upper mold 7 and the lower mold 8 may be the thickness of the web 4, and the distances between the upper mold 7 and the flange molds 9 may be the thicknesses of the flanges 5 and the chamfered portions 6 respectively.

As described above, it is a preferred condition that the portions corresponding to the flanges 5 are pressed after the portion corresponding to the web 4 is pressed, from a viewpoint of the reduction in the risk of generation of wrinkles and rips in fibers. Thus, the drive mechanism 10 is provided with a function to relatively move the upper mold 7, the lower mold 8 and the flange molds 9 so that the portions corresponding to the flanges 5 may be pressed by sandwiching the laminated body 2 of fiber sheets by the upper mold 7 and the flange molds 9 respectively after the portion corresponding to the web 4 is pressed by sandwiching the laminated body 2 of fiber sheets by the upper mold 7 and the lower mold 8.

More specifically, the drive mechanism 10 is configured to relatively move the upper mold 7, the lower mold 8 and the flange molds 9 so that the distances between the upper mold 7 and the flange molds 9 may be changed from the distances, longer than the thicknesses of the flanges 5 and the chamfered portions 6, down to the thicknesses of the flanges 5 and the chamfered portions 6 respectively after the distance between the upper mold 7 and the lower mold 8 has been changed from the distance, longer than the thickness of the web 4, down to the thickness of the web 4.

The drive mechanism 10 can be composed of desired devices, such as jacks and actuators, each having at least one desired drive system, such as an electric system, a hydraulic system and/or a pneumatic system. More specifically, the drive mechanism 10 can be composed of at least one desired mechanism of a cylinder mechanism in which a piston moves, a rack and pinion, a ball screw, a traveling mechanism having wheels moving along at least one rail, a crawler, and the like.

In an example shown in FIG. 1, the drive mechanism 10 is configured to press the portion corresponding to the web 4 by sandwiching the laminated body 2 of fibers between the upper mold 7 and the lower mold 8 between which the distance is changed in the vertical direction, and press the portions corresponding to the flanges 5 by sandwiching the laminated body 2 of fibers between the flange molds 9 and a set of the upper mold 7 and the lower mold 8, between which the distances are changed in the vertical direction and the horizontal direction respectively.

More specifically, the drive mechanism 10 in the example shown in FIG. 1 is composed of a gate type lifting device 10A, sliding devices 10B and lifting devices 10C. The lifting device 10A moves the upper mold 7 up and down in the vertical direction. The sliding devices 10B moves the flange molds 9 with expansion mechanisms in the horizontal direction respectively. The lifting devices 10C moves the flange molds 9 with expansion mechanisms in the vertical direction respectively. Meanwhile, the lower mold 8 is fixed. Thus, the dry preform 3 having the web 4 and the flanges 5 on the web 4 can be shaped by moving the upper mold 7 from the retreat position to the pressing position with the lifting device 10A, and moving the flange molds 9 from the retreat positions to the pressing positions with the sliding devices 10B and the lifting devices 10C respectively.

For example, each flange mold 9 can be provided with a traveling device composed of rollers or the like so that the flange mold 9 can be slid relatively to the lifting device 10C in the horizontal direction. Alternatively, each flange mold 9 may also be fixed to the lifting device 10C while a traveling device which moves the lifting device 10C in the horizontal direction may be included in the lifting device 10C. In addition, each flange mold 9 can be configured to be slidable relatively to the sliding device 10B in the vertical direction. Alternatively, each flange mold 9 may be fixed to the sliding device 10B while each sliding device 10B can be configured to be slidable relatively to the support column of the drive mechanism 10 in the vertical direction. Thereby, the horizontal movement of the flange mold 9 by the sliding device 10B can be performed independently from the vertical movement of the flange mold 9 by the lifting device 10C.

As a matter of course, the upper mold 7 may be fixed while the lower mold 8 may be moved up and down. Moreover, arrangement of the upper mold 7, the lower mold 8 and the flange molds 9 may be reversed in the vertical direction, and the dry preform 3 having the flanges 5 under the web 4 may be shaped.

The web 4 of the dry preform 3 can be pressed by uniaxial control which moves at least one of the upper mold 7 and the lower mold 8 in the vertical direction. That is, the number of drive axes of at least one of the upper mold 7 and the lower mold 8 can be made one. Meanwhile, each flange 5 is pressed by biaxial control which moves the flange mold 9 relatively in both the vertical direction and the horizontal direction. This is because it has been confirmed that an effect for reducing wrinkles generated in fibers cannot be obtained sufficiently when the flange mold 9 is moved by uniaxial control in the horizontal direction only or the vertical direction only.

On the contrary, it has been confirmed that generation of wrinkles on the chamfered portions 6 can be suppressed most in case where each flange mold 9 is moved horizontally to press the laminated body 2 of fiber sheets to a part of the upper mold 7 in the web 4 side, and subsequently each flange mold 9 is moved in the vertical direction to sandwich the laminated body 2 of fiber sheets between each flange mold 9 and the upper mold 7.

Nevertheless, moving the flange molds 9 in the vertical direction may be started while the flange molds 9 are moving in the horizontal direction in order to shorten shaping time. That is, each flange mold 9 may be moved in an oblique direction. Also in this case, it has been confirmed that it is important to move the flange molds 9 in the horizontal direction prior to the movement in the vertical direction from a viewpoint of suppressing possible wrinkles on the fibers.

Therefore, the retreat position of each flange mold 9 is determined to a position away from both the first face 7A of the upper mold 7, fitting one surface of the flange 5, and the second face 7B of the upper mold 7, fitting one surface of the web 4 so that each flange mold 9 can move in the vertical direction. For example, when the flange molds 9 are disposed below the upper mold 7 as shown in FIG. 1, the retreat positions of the flange molds 9 are determined as positions further away from the upper mold 7 horizontally than the pressing positions, and lower than the press positions.

Meanwhile, the drive mechanism 10 is configured to start to move the flange molds 9 to approach the second face 7B of the upper mold 7 after the movement of the flange molds 9 from the retreat positions to approach the first faces 7A of the upper mold 7 has been started or completed respectively. For example, when the flange molds 9 are disposed below the upper mold 7 as shown in FIG. 1, the drive mechanism 10 is configured to start moving the flange molds 9 up to approach the second face 7B of the upper mold 7 by the lifting devices 10C respectively after moving the flange molds 9 in the horizontal direction from the retreat positions to approach the first faces 7A of the upper mold 7 by the sliding devices 10B respectively has been started or completed.

Such biaxial control of the flange molds 9 allows starting to press the flanges 5 in the vertical direction after pressing the flanges 5 in the horizontal direction has been started or completed. As a result, each flange 5 can be gradually pressed from the web 4 side toward the end part. Accordingly, each flange 5 can be gradually adapted along the upper mold 7 in the thickness direction of the web 4, and thereby generation of wrinkles and rips in the fibers can be suppressed.

When at least one of the flange molds 9 is composed of the divided molds 9A disposed at different positions in the length direction of the flange 5 as exemplified by FIG. 3, the drive mechanism 10 controls the divided molds 9A to start moving at different timing. Specifically, when the curvature of the flange 5 is constant, the divided molds 9A are moved stepwisely from the divided mold 9A disposed at the center toward the divided molds 9A disposed in both sides so that the flange 5 may be pressed stepwisely from the center of the flange 5 toward both sides as described above. Meanwhile, when the curvature of the flange 5 is not constant, the divided molds 9A are moved from the divided mold 9A disposed at a portion, at which the curvature of the flange 5 is large, so that the flange 5 may be pressed stepwisely from the portion, at which the curvature is large, toward both sides or in one direction. Such movement control of the divided molds 9A can reduce the risk that wrinkles arise on fibers.

The fixing jigs 11 are clamps for fixing end parts of the laminated body 2 of fiber sheets hanging down due to the gravity when the portion corresponding to the web 4 is pressed by gradually narrowing the distance between the upper mold 7 and the lower mold 8. Therefore, when the fixing jigs 11 interfere with the flange molds 9, the fixing jigs 11 are removed before pressing the flanges 5 is started. For example, the fixing jig 11 can be composed of a member for sandwiching an end part of the laminated body 2 of fiber sheets, a bolt for fixing the member, and the like.

When the surface of the web 4 is pressed by moving at least one of the upper mold 7 and the lower mold 8 in the vertical direction in a state where end parts of the laminated body 2 of fiber sheets hanging down due to the gravity have been fixed at upper positions by the fixing jigs 11, the portion corresponding to the web 4 can be pressed in a state where the laminated body 2 of fiber sheets has been pulled upward. That is, the portion corresponding to the web 4 can be pressed in a state where tension has been constantly generated in the laminated body 2 of fiber sheets. As a result, slacks which may be generated in the laminated body 2 of fiber sheets can be decreased, and thereby the risk that wrinkles are generated in the pressed laminated body 2 of fibers can be reduced.

The heaters 12 heats at least one of the surface of the upper mold 7 and the surface of the lower mold 8 when binder is included in the laminated body 2 of fiber sheets which is used as a material of the dry preform 3. Therefore, when only the laminated body 2 of fiber sheets in which binder is not included is the material, the heaters 12 may be omitted.

Figure 4:
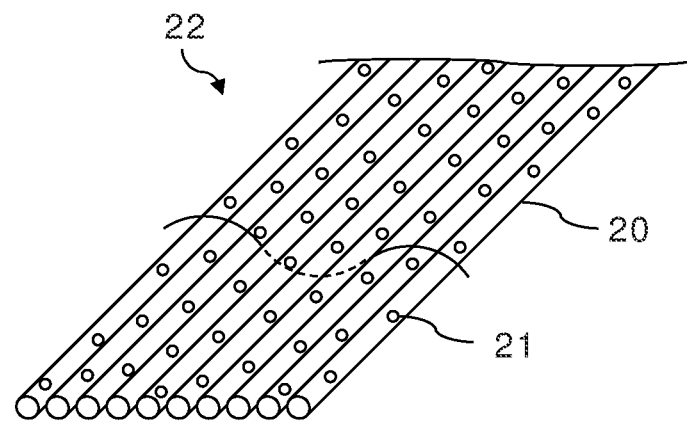
FIG. 4 is a perspective view showing the structure of a fiber sheet on which particulates each consisting of thermoplastic resin have been attached as thermoplastic binder.
Figure 5:
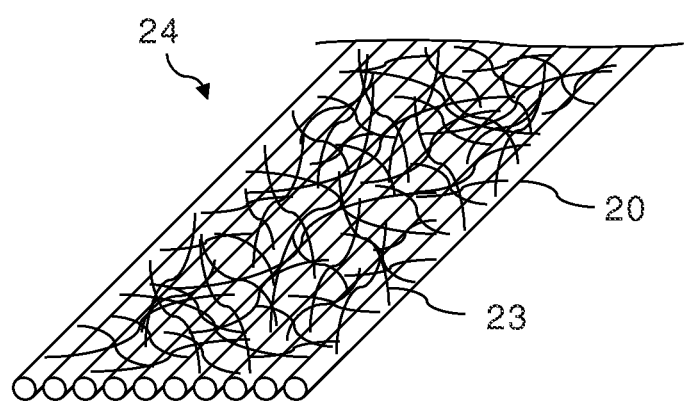
FIG. 5 is a perspective view showing the structure of a fiber sheet on which thermoplastic non-woven fabric has been attached as thermoplastic binder.

FIG. 4 is a perspective view showing the structure of a fiber sheet on which particulates each consisting of thermoplastic resin have been attached as thermoplastic binder while FIG. 5 is a perspective view showing the structure of a fiber sheet on which thermoplastic non-woven fabric has been attached as thermoplastic binder.

As shown in FIG. 4, a dry tape material 22 consisting of a fiber bundle 20, bundled into a sheet shape, and particulates 21 made of thermoplastic resin dredged as thermoplastic binder on the fiber bundle 20 has been marketed. Meanwhile, a dry tape material 24 consisting of a fiber bundle 20, bundled into a sheet shape, and thermoplastic non-woven fabric 23 laminated as thermoplastic binder on the fiber bundle 20 as shown in FIG. 5 has also been marketed. In addition, a fiber sheet on which powdered or liquid thermosetting binder has been attached, and a fiber sheet on which resin, such as elastomer, has been attached as binder are also known.

When the laminated body 2 of fiber sheets including binder is shaped, the fiber sheets can be temporarily fixed, and a shape after shaping the laminated body 2 of fiber sheets can be kept by heat-sealing the binder. Moreover, binder is sometimes used in order to improve the fracture toughness of a molded composite material.

When one surface or both surfaces of the upper mold 7 and the lower mold 8 are heated by the heaters 12, a shape of the dry preform 3 can be kept by utilizing binder included in the shaped laminated body 2 of fiber sheets. Specifically, when the binder is thermoplastic resin, the thermoplastic binder included in the laminated body 2 of fiber sheets can be melted by heating the laminated body 2 of fiber sheets in a state where the upper mold 7, the lower mold 8 and the flange molds 9 have been positioned to the pressing positions. Then, cooling the shaped laminated body 2 of fiber sheets by air cooling or the like makes the thermoplastic binder be solidified, and thereby the dry preform 3 having a stable shape can be produced.

Meanwhile, when the binder is thermosetting resin, the thermosetting binder included in the laminated body 2 of fiber sheets can be cured by heating the laminated body 2 of fiber sheets in a state where the upper mold 7, the lower mold 8 and the flange molds 9 have been positioned to the pressing positions. Thereby, the dry preform 3 having a stable shape can be produced.

As long as necessary heat can be given to binder included in the laminated body 2 of fiber sheets, a desired device can be used as the heater 12. For example, the heaters 12 may be configured by building pipes of a heating medium or resistance heating elements in each of the upper mold 7 and the lower mold 8. Alternatively, the heaters 12 which heat the surfaces of the upper mold 7 and the lower mold 8 respectively by electromagnetic induction or passage of electric current may be prepared. As a matter of course, each flange mold 9 may be heated by the heater 12.

(Preform Shaping Method and Composite Material Molding Method)

Next, a preform shaping method for producing the dry preform 3 by the preform shaping apparatus 1 and a composite material molding method for producing a composite material using the dry preform 3, produced in the preform shaping method, as a material will be described.

Figure 6:
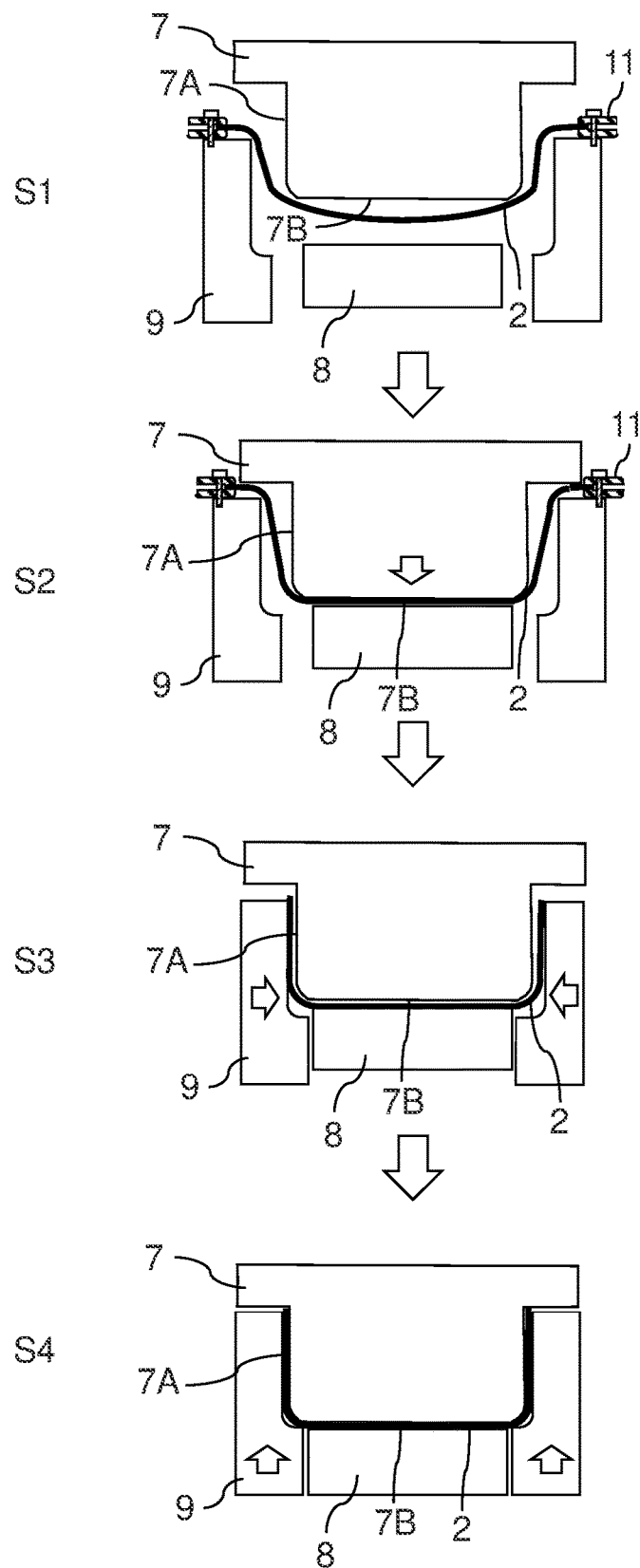
FIG. 6 is a flow chart showing a flow for producing the dry preform by the preform shaping apparatus shown in FIG. 1.

FIG. 6 is a flow chart showing a flow for producing the dry preform 3 by the preform shaping apparatus 1 shown in FIG. 1. Note that, the flow for producing the dry preform 3 will be described in FIG. 6 with reference to relative positions of the upper mold 7, the lower mold 8, and the flange molds 9.

Firstly, in step S1, the upper mold 7, the lower mold 8 and the flange molds 9 are positioned to the retreat positions by the drive mechanism 10. Then, the laminated body 2 of fiber sheets, which is a material of the dry preform 3, is set to a space surrounded by the upper mold 7, the lower mold 8 and the flange molds 9. The end parts of the laminated body 2 of fiber sheets can be fixed to desired objects, such as the flange molds 9, by the fixing jigs 11.

Next, in step S2, the lifting device 10A of the drive mechanism 10 moves the upper mold 7 down. Thereby, the portion corresponding to the web 4 can be pressed by sandwiching the laminated body 2 of fiber sheets by the second face 7B of the upper mold 7 and the surface of the lower mold 8. At this time, tension is always generated in the laminated body 2 of fiber sheets since the end parts of the laminated body 2 of fiber sheets have been fixed by the fixing jigs 11. Accordingly, generation of wrinkles and rips in the fibers can be suppressed. After the portion corresponding to the web 4 has been pressed, the fixing jigs 11 are removed, as necessary.

Next, in step S3, the sliding devices 10B of the drive mechanism 10 slide the flange molds 9 horizontally toward the upper mold 7 respectively. Thereby, the end parts of the laminated body 2 of fiber sheets are pressed onto the first faces 7A of the upper mold 7, and the portions which are to become the flanges 5 respectively rise up. When at least one of the flange molds 9 is composed of the divided molds 9A, the divided molds 9A are moved stepwise in the horizontal direction in an appropriate order, and are pressed toward the first face 7A of the upper mold 7.

Figure 7A:
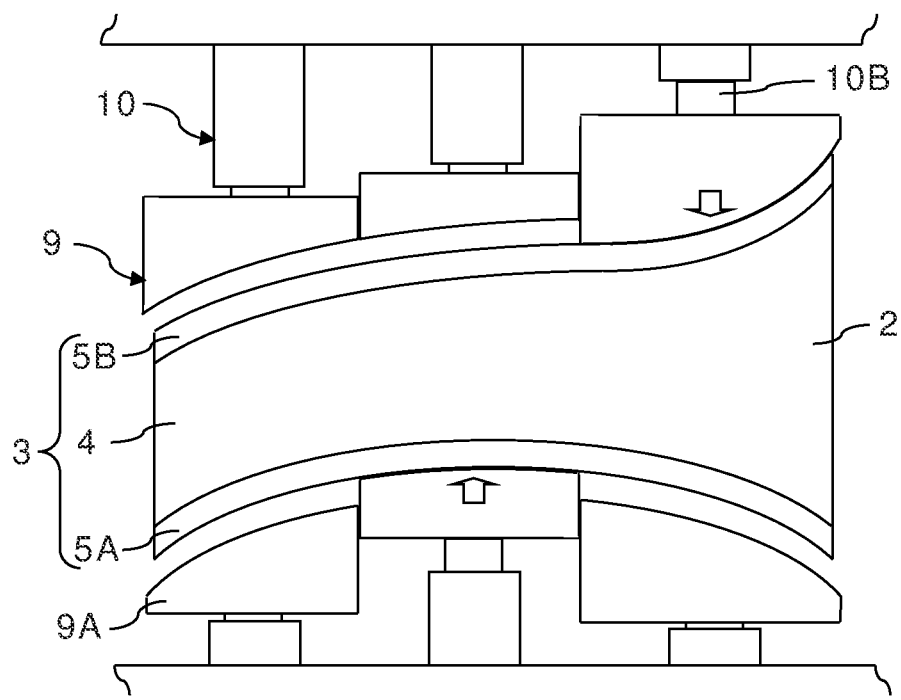
FIG. 7A and FIG. 7B show an example of an order for horizontally moving the divided molds shown in FIG. 3 toward the upper mold.
Figure 7B:
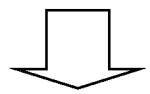
Figure 7B:
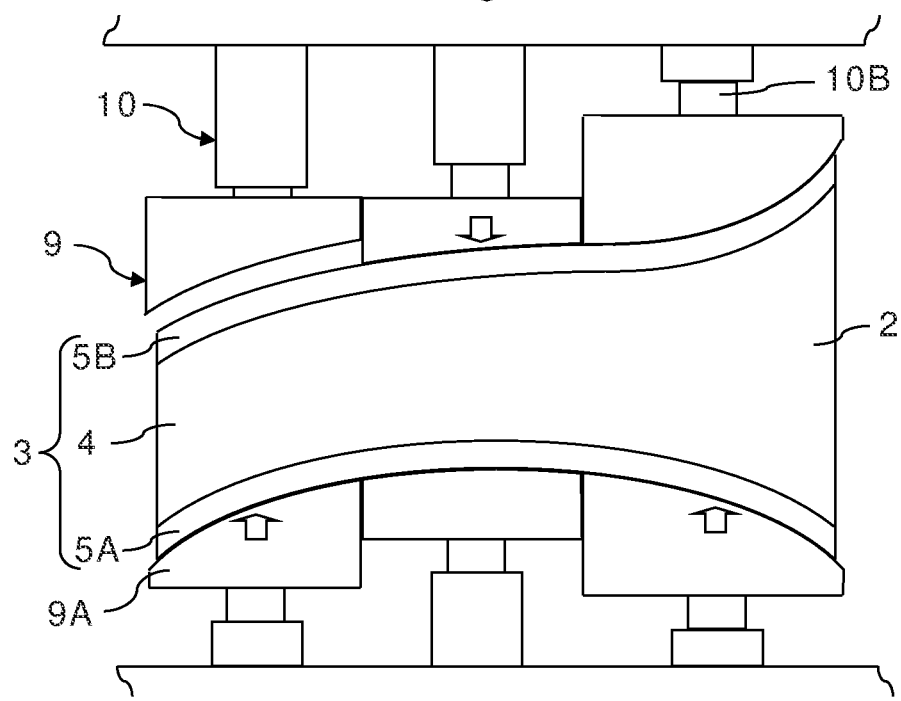

FIG. 7A and FIG. 7B show an example of an order for horizontally moving the divided molds 9A shown in FIG. 3 toward the upper mold 7.

For example, as for the flange 5A having a constant curvature as shown in FIG. 7A, the divided mold 9A disposed at the center of the flange 5A can be firstly slid horizontally. Meanwhile, as for the flange 5B having a non-constant curvature, the divided mold 9A disposed at a portion at which the curvature of the flange 5B is large can be firstly slid horizontally.

Next, as shown in FIG. 7B, as for the flange 5A having the constant curvature, the two divided molds 9A disposed in both sides of the divided mold 9A disposed at the center of the flange 5A can be slid horizontally. Meanwhile, as for the flange 5B having the non-constant curvature, the divided mold 9A disposed adjacently to the portion at which the curvature of the flange 5B is large can be slid horizontally. After that, the remaining divided mold 9A or the remaining divided molds 9A can be slid horizontally toward the outside similarly.

Note that, horizontal movement of the subsequent divided mold 9A may be started before previously started horizontal movement of the divided mold 9A has been completed. That is, the divided molds 9A may be simultaneously moved in the horizontal direction with changing timing of starting movement, or, on the contrary, horizontal movement of the subsequent and adjacent divided mold 9A may be started after previously started horizontal movement of the divided mold 9A has been completed.

Such stepwise movement of the divided molds 9A can reduce the risk of generation of wrinkles in fibers.

Next, in step S4, the lifting devices 10C of the drive mechanism 10 elevate the flange molds 9. Thereby, the portions of the laminated body 2 of fiber sheets, which are to become the flanges 5, are sandwiched and pressed by the flange molds 9 and the upper mold 7 respectively. As mentioned above, movement for making the flange molds 9 close to the second faces 7B of the upper mold 7 respectively can be started after completing movement for respectively making the flange molds 9 close to the first faces 7A of the upper mold 7 from the retreat positions which are away from the first faces 7A of the upper mold 7, having shapes fitting the inner surfaces of the flanges 5, and the second face 7B of the upper mold 7, having a shape fitting the inner surface of the web 4.

Alternatively, the movement for making the flange molds 9 close to the second face 7B of the upper mold 7 may be started after starting the movement for making the flange molds 9 close to the first faces 7A of the upper mold 7 from the retreat positions. That is, operation of the sliding devices 10B for sliding the flange molds 9 horizontally, and operation of the lifting devices 10C for elevating the flange molds 9 in the vertical direction may be temporally overlapped with each other. In that case, the flange molds 9 are moved upward and obliquely.

When at least one of the flange molds 9 is composed of the divided molds 9A, the divided molds 9A may be also elevated stepwisely in an order in which wrinkles are hardly generated in fibers. That is, not only timing of starting horizontal movement of the divided molds 9A but also timing of starting vertical movement of the divided molds 9A can be changed. Nevertheless, when the vertical movement of the divided molds 9A is started after completing the horizontal movement of the divided molds 9A, the divided molds 9A may be elevated simultaneously since the laminated body 2 of fibers has been already sandwiched between the divided molds 9A and the first faces 7A of the upper mold 7. An elevating order of the divided molds 9A can be determined appropriately by actual tests.

When the end parts of the laminated body 2 of fiber sheets have been sandwiched by the flange molds 9 and the upper mold 7, and thereby the portions corresponding to the flanges 5 have been pressed respectively, the shape of the laminated body 2 of fiber sheets becomes that of the dry preform 3. Note that, when binder is included in the laminated body 2 of fiber sheets, the surface of at least one of the upper mold 7 and the lower mold 8 can be heated by the heaters 12. Thereby, the dry preform 3 of which shape has been kept by the binder can be produced.

When a composite material is produced using the dry preform 3 produced in this way, a process in which the dry preform 3 is impregnated with thermosetting resin, and subsequently the thermosetting resin is thermally cured is performed. In order to perform the process in which the dry preform 3 is impregnated with the thermosetting resin, and subsequently the thermosetting resin is thermally cured, it is practical to transfer the dry preform 3 on another jig for molding a composite material.

Figure 8:
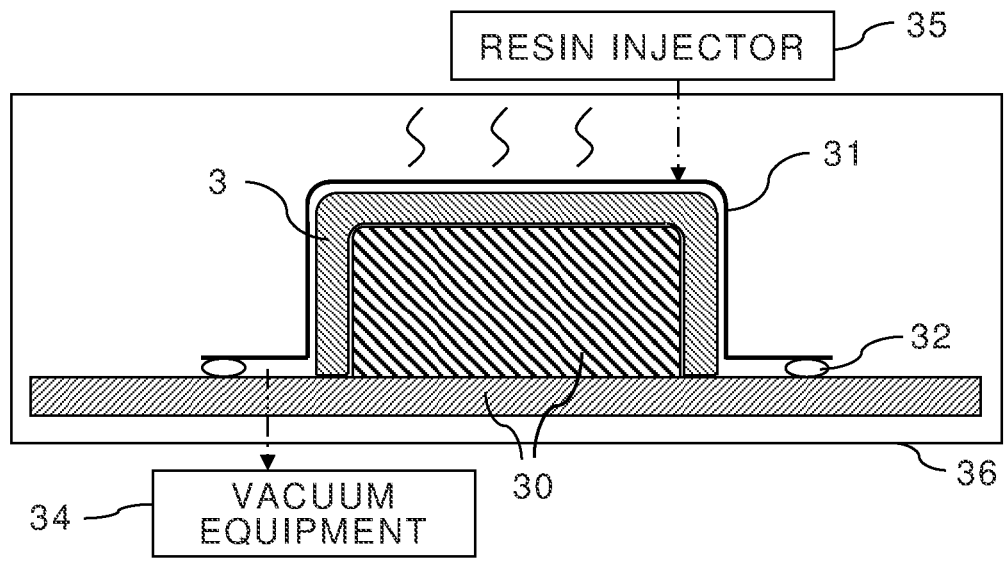
FIG. 8 shows an example of forming a composite material by the VaRTM method.
Figure 9:
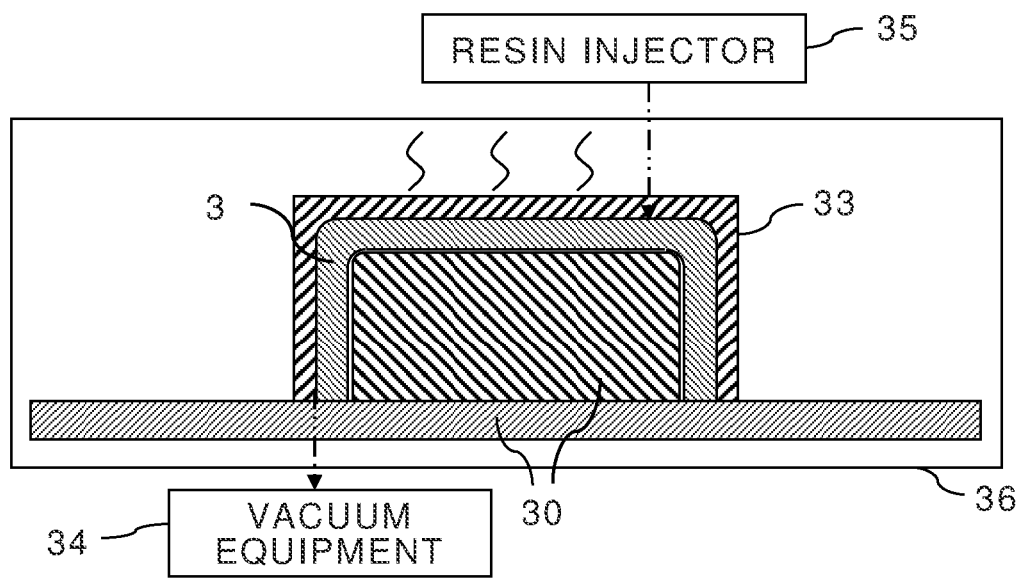
FIG. 9 shows an example of forming a composite material by the Matched-die RTM method.

FIG. 8 shows an example of forming a composite material by the VaRTM method while FIG. 9 shows an example of forming a composite material by the Matched-die RTM method.

When a composite material is molded by VaRTM method, the dry preform 3 is placed on a lower mold 30 as shown in FIG. 8. Then, the dry preform 3 is covered with a bagging film 31, and the edges of the bagging film 31 are stuck on the lower mold 30 by sealant 32. Meanwhile, when a composite material is molded by Matched-die RTM method, the dry preform 3 is set to a space formed between a lower mold 30 and an upper mold 33.

After that, thermosetting resin heated up to such degree that fluidity can be obtained is injected from a resin injecting apparatus 35 into the space in which the dry preform 3 has been set in a state where the space in which the dry preform 3 has been set is evacuated by vacuum equipment 34. Thereby, the dry preform 3 can be impregnated with the thermosetting resin.

Next, the thermosetting resin is heated by a heater 36, such as an oven, so that the temperature of the thermosetting resin may rise up to the curing temperature. Thereby, the thermosetting resin can be cured and a composite material having a shape corresponding to the shape of the dry preform 3 having the web 4 and the flanges 5 can be molded.

Note that, in order to mold a composite material successively with the upper mold 7, the lower mold 8 and the flange molds 9 for shaping the dry preform 3 without transferring the dry preform 3 onto another jig for molding the composite material, it is necessary to seal gaps, formed between the upper mold 7, the lower mold 8 and the flange molds 9, with packings or the like so that liquid resin injected during vacuuming may not leak out.

Effects

As described above, the preform shaping apparatus 1, the preform shaping method and the composite material molding method shape the dry preform 3 having the web 4 and the flanges 5, and press the flanges 5 by moving the flange molds 9 in two directions after the web 4 has been pressed by the upper mold 7 and the lower mold 8.

Therefore, according to the preform shaping apparatus 1, the preform shaping method and the composite material molding method, wrinkles and rips can be prevented from arising in the dry preform 3 which has the web 4 and the flanges 5.

In case of a conventional simple shaping method of pressing fibers by moving a pair of an upper mold and a lower mold relatively in a uniaxial direction, wrinkles and rips have been generated in fibers in many portions including a web surface, a flange surface in which tension is generated in fibers, and a flange surface in which fibers are loosened.

On the contrary, according to the preform shaping apparatus 1, the preform shaping method, and the composite material molding method as mentioned above. the dry preform 3 can be shaped with high quality without generating wrinkles and rips in fibers in any of the surfaces of the web 4, the surfaces of the flanges 5 in which tension is generated in fibers and the surfaces of the flanges 5 in which fibers are loosened.

(Modification)

Figure 10:
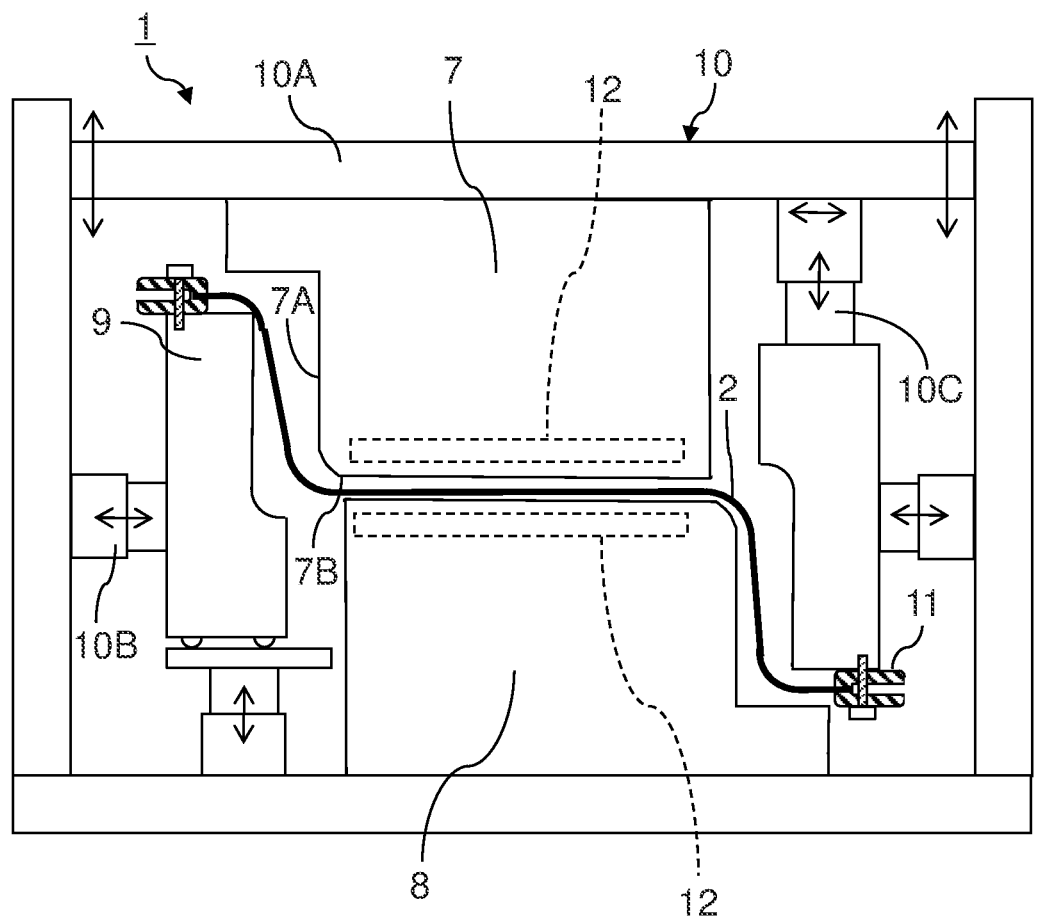
FIG. 10 shows a structure of a modification of the preform shaping apparatus according to the first implementation of the present invention.
Figure 11:
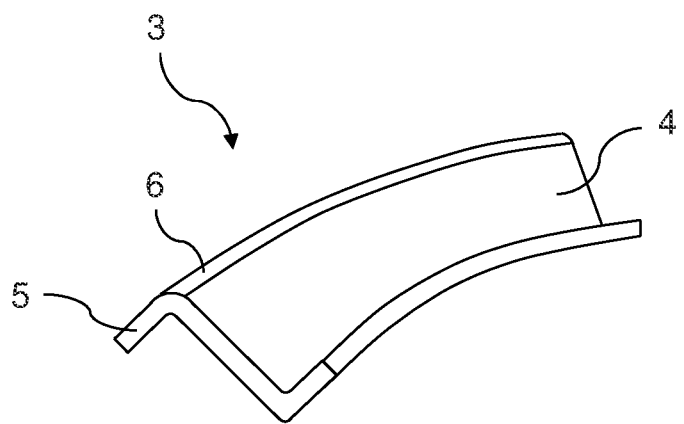
FIG. 11 is a perspective view showing an example of a shape of a dry preform produced by the preform shaping apparatus shown in FIG. 10.

FIG. 10 shows a structure of a modification of the preform shaping apparatus according to the first implementation of the present invention. FIG. 11 is a perspective view showing an example of a shape of a dry preform produced by the preform shaping apparatus shown in FIG. 10.

As shown in FIG. 10, at least one of the flange molds 9 may be moved up from the retreat position in the lower mold 8 side so as to approach the upper mold 7 so that at least one of the flanges 5 can be pressed between the at least one flange mold 9 and the upper mold 7 while the other flange mold 9 or flange molds 9 may be moved down from the retreat position or retreat positions in the upper mold 7 side so as to approach the lower mold 8 so that the other flange 5 or flanges 5 can be pressed between the other flange mold 9 or flange molds 9 and the lower mold 8.

Although the lifting device 10C which moves the flange mold 9 down from the retreat position in the upper mold 7 side is a suspended device which horizontally slides along a support column in the horizontal direction while suspending the flange mold 9, in an example shown in FIG. 10, the lifting device 10C may be a device which supports the flange mold 9 from the lower side. Moreover, the flange mold 9 may be slid horizontally relatively to the lifting device 10C as mentioned above. Alternatively, the lifting device 10C of suspended type may be slid horizontally by the sliding device 10B.

When the laminated body 2 of fibers is shaped by the preform shaping apparatus 1 shown in FIG. 10, the dry preform 3 having such a shape that the two flanges 5 are bent, in the opposite directions to each other, in one side of the web 4 as exemplified by FIG. 11 can be produced.

(Second Implementation)

Figure 12:
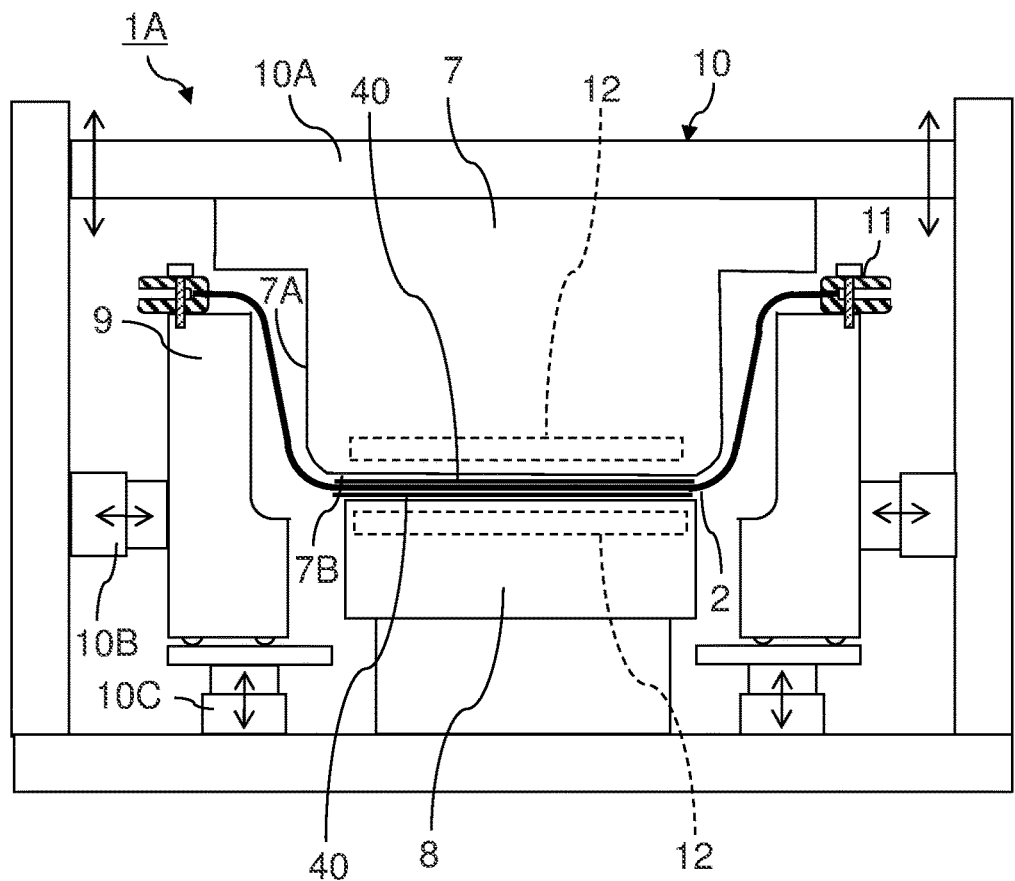
FIG. 12 shows a structure of a preform shaping apparatus according to the second implementation of the present invention.

FIG. 12 shows a structure of a preform shaping apparatus according to the second implementation of the present invention.

A preform shaping apparatus 1A in the second implementation shown in FIG. 12 is different from the preform shaping apparatus 1 in the first implementation in a point that a sheet 40 having heat resistance and heat insulating property is disposed between the laminated body 2 of fiber sheets, which is a material of the dry preform 3, and at least one of the upper mold 7 and the lower mold 8. Other structures and actions of the preform shaping apparatus 1A in the second implementation are not substantially different from those of the preform shaping apparatus 1 in the first implementation. Therefore, the same signs are attached to the same elements and corresponding elements, and explanation thereof is omitted.

When one surface or both surfaces of the upper mold 7 and the lower mold 8 are heated by the heater 12 or heaters 12, the sheet 40 having heat resistance and heat insulating property can be disposed between the laminated body 2 of fiber sheets and at least one surface of the upper mold 7 and the lower mold 8 heated by the heater 12 or heaters 12 as shown in FIG. 12.

Figure 13:
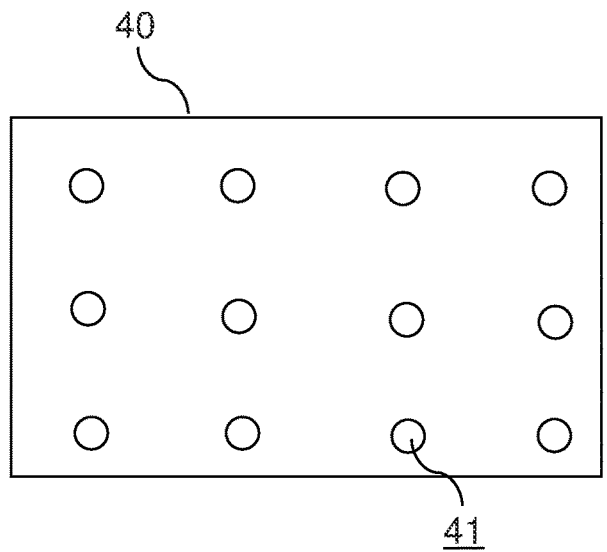
FIG. 13 is a top view of the sheet shown in FIG. 12.

FIG. 13 is a top view of the sheet 40 shown in FIG. 12.

The sheet 40 having heat resistance and heat insulating property has holes 41. Therefore, heat conduction from the surface of at least one of the upper mold 7 and the lower mold 8, heated by the heater 12 or heaters 12, to the laminated body 2 of fiber sheets is limited to the holes 41 of the sheet 40 at the time of shaping the dry preform 3. As a result, the laminated body 2 of fiber sheets is not heated entirely but heated locally. Accordingly, the laminated body 2 of fiber sheets can be locally heat-sealed with binder, and thereby the fiber sheet layers can be temporarily fixed in a state that there are portions, which are not heat-sealed, between the fiber sheet layers.

That is, the laminated body 2 of fiber sheets including binder can be partially and temporarily fixed by the binder by not only pressing the laminated body 2 of fiber sheets by the upper mold 7, the lower mold 8 and the flange molds 9, but also heating the surface of at least one of the upper mold 7 and the lower mold 8 by the heater 12 or heaters 12 in a state where the sheet 40, having heat resistance and heat insulating property, on which the holes 41 have been formed, has been disposed between the laminated body 2 of fiber sheets and the at least one of the upper mold 7 and the lower mold 8 of which surface or surfaces are heated by the heater 12 or heaters 12.

In this case, impregnation property of resin can be improved when the dry preform 3 is impregnated with the resin, compared with a case where the whole surfaces of the fiber sheet layers are heat-sealed by the binder. Specifically, resin can be penetrated through portions in which fiber layers are not heat-sealed with each other. That is, while heat-sealing the whole surfaces of fiber layers by binder makes it difficult to impregnate the fiber layers with resin, heat-sealing the fiber layers partially allows improving impregnation property of the resin at the time of molding a composite material.

Note that, the sheet 40 having heat resistance, heat insulating property and the holes 41 may be placed not only in the preform shaping apparatus 1A, having the upper mold 7, the lower mold 8 and the flange molds 9, but also in a simple preform shaping apparatus, having an upper mold and a lower mold.

More specifically, when a preform shaping apparatus includes: an upper mold whose surface fits a partial face of a dry preform; a lower mold whose surface fits another partial face of the dry preform; a driving mechanism positioning the upper mold and the lower mold relatively so that the distance between the upper mold and the lower mold may be changed from a distance longer than the thickness of the dry preform down to the thickness of the dry preform; and at least one heater heating the surface of at least one of the upper mold and the lower mold, the sheet 40 having the holes 41, heat resistance and heat insulating property can be disposed between a laminated body of fiber sheets, which is a material of the dry preform, and at least one of the upper mold and the lower mold. Thereby, heat conduction from the surface of at least one of the upper mold and the lower mold, heated by the at least one heater, to the laminated body of fiber sheets can be limited to the insides of the holes 41.

In this case, the laminated body of fiber sheets including binder can be sandwiched and pressed by the upper mold whose surface fits a partial face of a dry preform and the lower mold whose surface fits another partial face of the dry preform in the state where the sheet 40 having the holes 41, heat resistance and heat insulating property has been disposed between the laminated body of fiber sheets and at least one of the upper mold and the lower mold of which surface or surfaces are to be heated by the at least one heater, in order to produce the dry preform. In addition, at least one surface of the upper mold and the lower mold can be heated by the at least one heater in the state where the heat conduction from the at least one surface of the upper mold and the lower mold, heated by the at least one heater, to the laminated body of fiber sheets has been limited to the insides of the holes 41. Thereby, the laminated body of sheet fibers can be temporarily fixed by the binder.

Therefore, the degree of heat insulating property given to the sheet 40 has only to be one which can reduce heat transfer from a mold of which surface is heated by the heater 12 so that the temperature of binder included in the portions, on which the holes 41 are not disposed, of the laminated body 2 of fibers may be a temperature at which the binder is not heat-sealed.

(Third Implementation)

Figure 14:
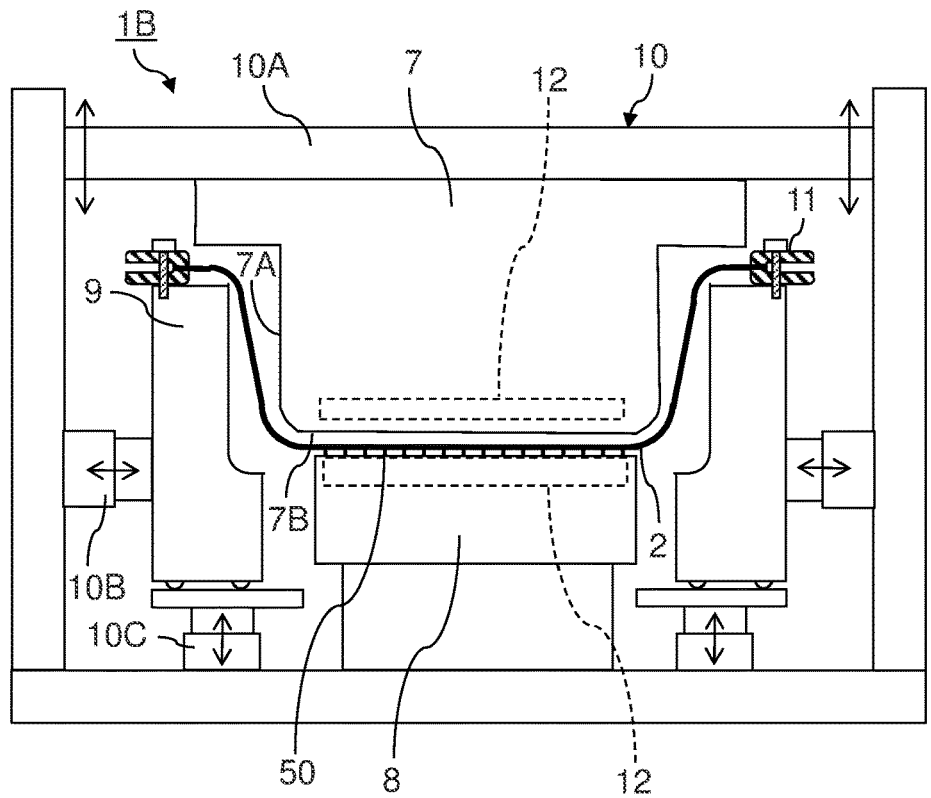
FIG. 14 shows a structure of a preform shaping apparatus according to the third implementation of the present invention.

FIG. 14 shows a structure of a preform shaping apparatus according to the third implementation of the present invention.

A preform shaping apparatus 1B in the third implementation shown in FIG. 14 is different from the preform shaping apparatus 1 in the first implementation in a point that rod-like structures 50, consisting of pins, needles, or the like, each having thermal conductivity are disposed on the surface of at least one of the upper mold 7 and the lower mold 8. Other structures and actions of the preform shaping apparatus 1B in the third implementation do not substantially differ from those of the preform shaping apparatus 1 in the first implementation. Therefore, the same signs are attached to the same elements and corresponding elements, and explanation thereof is omitted.

In the preform shaping apparatus 1B in the third implementation, the rod-like structures 50 each having thermal conductivity are disposed in a state that the rod-like structures 50 are projected from the surface of at least one of the upper mold 7 and the lower mold 8. Meanwhile, the heater 12 is configured to heat the rod-like structures 50. As a concrete example, each of the rod-like structures 50 can be made of a metal or the like having electrical conductivity so that the rod-like structures 50 can be heated by passing electric currents.

Accordingly, the laminated body 2 of fiber sheets can be temporarily fixed by locally heating the laminated body 2 of fiber sheets by the rod-like structures 50 heated by the heater 12 while the laminated body 2 of fiber sheets can be prevented from sliding by inserting the rod-like structures 50 in the laminated body 2 of fiber sheets.

Note that, the rod-like structures 50 may be slidable in the vertical direction so that the rod-like structures 50 can be housed inside the upper mold 7 or the lower mold 8.

(Fourth Implementation)

Figure 15:
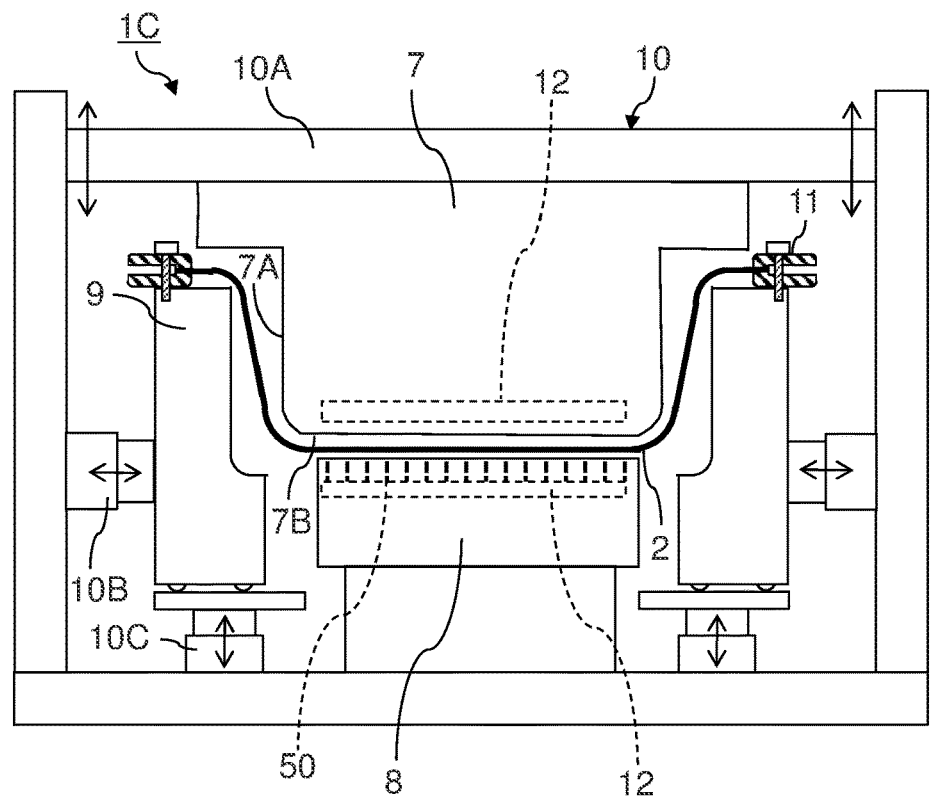
FIG. 15 shows a structure of a preform shaping apparatus according to the fourth implementation of the present invention.

FIG. 15 shows a structure of a preform shaping apparatus according to the fourth implementation of the present invention.

A preform shaping apparatus 1C in the fourth implementation shown in FIG. 15 is different from the preform shaping apparatus 1B in the third implementation in a point that the rod-like structures 50 are disposed so that the rod-like structures 50 may not protrude from the surface of at least one of the upper mold 7 and the lower mold 8. Other structures and actions of the preform shaping apparatus 1C in the fourth implementation are not substantially different from those of the preform shaping apparatus 1B in the third implementation. Therefore, the same signs are attached to the same elements and corresponding elements, and explanation thereof is omitted.

In the preform shaping apparatus 1C in the fourth implementation, the rod-like structures 50 heated by the heater 12 are built in at least one of the upper mold 7 and the lower mold 8. Accordingly, the surface of at least one of the upper mold 7 and the lower mold 8 can be locally heated by the rod-like structures 50.

The rod-like structures 50 may be retractable from the inner surface of the upper mold 7 or the lower mold 8 so that the whole surface of the upper mold 7 or the lower mold 8 may not be heated by the rod-like structures 50. That is, the surface of the upper mold 7 or the lower mold 8 may be heated locally and momentarily by contacting the rod-like structures 50 momentarily with the inner surface of the upper mold 7 or the lower mold 8. As a matter of course, a heating period of the rod-like structures 50 may be controlled so that the whole surface of the upper mold 7 or the lower mold 8 may not be heated.

In case of building the rod-like structures 50 in the upper mold 7 or the lower mold 8, a composite material can be molded by vacuuming, injecting thermosetting resin, and thermally curing the thermosetting resin as long as gaps formed between the upper mold 7, the lower mold 8 and the flange molds 9 which have been positioned to the pressing positions respectively are sealed. Thus, the rod-like structures 50 may be heated by electrically heating or the like by the heater 12 at the time of temporarily fixing fibers while the whole surface of at least one of the upper mold 7 and the lower mold 8 may be heated by electromagnetic induction or the like by another heater 12 at the time of thermally curing thermosetting resin.

OTHER IMPLEMENTATIONS

While certain implementations have been described, these implementations have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

For example, although a case where resin included in a composite material is thermosetting resin has been explained in each above-mentioned example, a composite material may be made of thermoplastic resin. The thermoplastic resins fall into the general classification of crystalline resin and amorphous resin. Concrete examples of crystalline resin include polyester resin, polyamide resin, polyethylene resin, and polypropylene resin. Meanwhile, concrete examples of amorphous resin include polystyrene resin, ABS resin (acrylonitrile, butadiene, and copolymerization synthetic resin of styrene), and polycarbonate resin.

When a composite material is molded using thermoplastic resin, the dry preform 3 is impregnated with the thermoplastic resin to which fluidity has been given by heating and melting. Then, the thermoplastic resin with which the dry preform 3 has been impregnated can be cured by cooling the thermoplastic resin. Therefore, a cooling device may be disposed for cooling and curing thermoplastic resin instead of the heaters 12 for thermally curing thermosetting resin. Alternatively, thermoplastic resin may be cured by air cooling without any cooling device.

What is claimed is:

1. A preform shaping apparatus for producing a preform having a web, at least one flange, and a chamfered portion between the web and the at least one flange by pressing a laminated body of fiber sheets with a plurality of molds, the at least one flange being bent in a single side of the web, the chamfered portion being at least one of a round chamfered edge or a flat chamfered edge, the apparatus comprising:

a first mold having a first surface fitting each of a surface in one side of the web, an inner surface of the chamfered portion and a surface in one side of the at least one flange;

a second mold having a second surface fitting a surface in an other side of the web;

a third mold having a third surface fitting each of a surface in an other side of the at least one flange and an outer surface of the chamfered portion; and a drive mechanism having:

a first lifting device configured to move at least one of the first mold and the second mold up and down in a vertical direction between a first retreat position where a first distance between the first mold and the second mold becomes longer than a thickness of a portion in the laminated body of fiber sheets corresponding to the web and a first press position where the first distance becomes the thickness of the web; and a second lifting device configured to move the third mold up and down in a vertical direction between a second retreat position where a second distance between the first mold and the third mold becomes longer than each thickness of portions in the laminated body of fiber sheets corresponding to the at least one flange and the chamfered portion and a second press position where the second distance becomes each thickness of the flange and the chamfered portion, and a slide device configured to move the third mold horizontally in a horizontal direction between the second retreat position and the second press position, wherein the drive mechanism is configured so that movement in the horizontal direction by the sliding device and movement in the vertical direction by the second lifting device are performed such that, after pressing by the first mold and the second mold is completed as the first lifting device moves at least one of the first mold and the second mold, pressing of a portion of the laminated body corresponding to the chamfered portion is started after pressing of a portion of the laminated body corresponding to the flange is started by the third mold and the first mold.

2. The preform shaping apparatus according to claim 1, further comprising:

a heater that heats at least one of the first surface of the first mold and the second surface of the second mold.

* * * * *